INVENTOR
R. J. PIERETH
BY J. P. Kearns
ATTORNEY 3,403,229

ERROR PREVENTING SUPERVISORY CIRCUIT IN A PBX HAVING SCANNER SWITCHOVER MEANS

Richard J. Piereth, Middletown, N.J., assignor to Bell Telephone Laboratories, Incorporated, New York, N.Y., a corporation of New York Filed Sept. 21, 1965, Ser. No. 488,953
9 Claims. (Cl. 179—18)

ABSTRACT OF THE DISCLOSURE

A transfer control circuit in a time division multiplex PBX switching system in which the introduction of errors arising out of the switchover of the off line scanner to the on line scanner is minimized by trigger, logic and timer circuits. The trigger, logic and timer circuits update the off line scanner and then introduce a time period when neither scanner is operational. Subsequently, the off line scanner becomes operational through the actuation of various switchover circuits and takes over scanning control.

Figure 1:
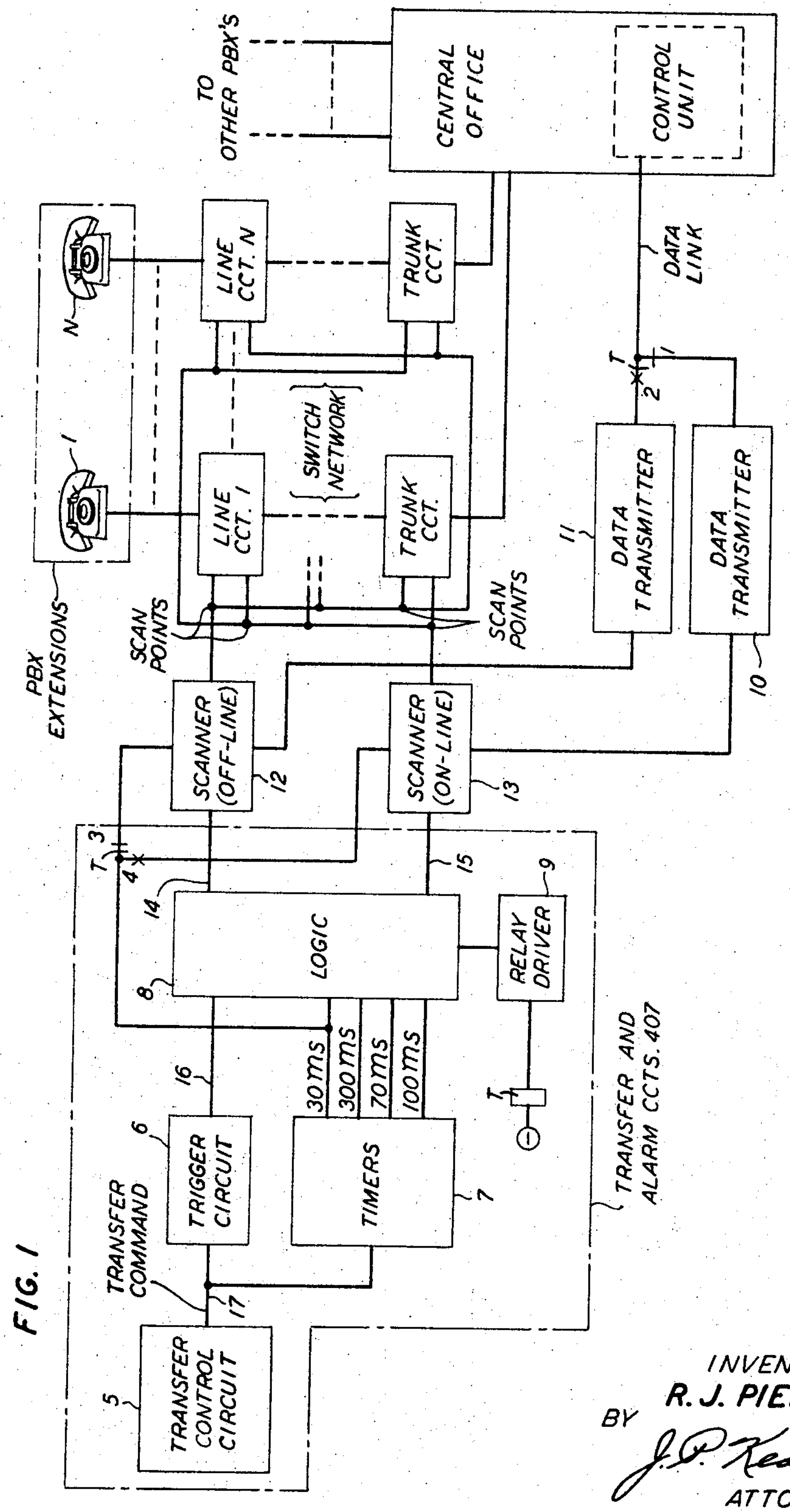

This invention relates to supervisory circuitry for telephone systems and more particularly to circuits for preventing errors in electronic communications systems.

With the advent of modern communications techniques, more rapid switching and data storage have come increasingly into vogue. Attendant upon these changes and advances, the rapid transmission of data with high degrees of accuracy has become a basic prerequisite to nearly all important switching systems. Thus, in any data processing system, facilities must be included to assure that data is stored and processed without errors so that transmission of the data can be achieved with negligible inaccuracies.

In many of the newer time-based or "time-division" systems, data is stored according to positions along a divided time scale whereby each segment of time or "memory slot" corresponds to a particular state or condition which is to be supervised. For example, a telephone time division system is disclosed in the copending patent application of R. C. Gebhardt et al. Ser. No. 195,199, filed May 16, 1962 now Patent Number 3,225,144. In the Gebhardt et al. system, each memory slot represents the condition of an observed line or extension of a telephone private branch exchange; line conditions such as on hook, off hook, ringing voltage applied, etc., can be monitored. Each time a change in state occurs, the appropriate memory slot, which directly corresponds to that line whose state has just changed, must be located and an appropriate data bit stored therein. Based upon the digital information thereby stored, many subsequent steps are taken with regard to establishing switching connections to and from the line involved. A clear necessity therefore exists for this data to be properly and accurately stored.

It is therefore an object of this invention to provide for accurate storage of data.

Another object of this invention is to prevent erroneous data bits from being stored in a data processing system.

A further object of this invention is to insure that memory slots in a time division switching system are kept separate and distinct with respect to data to be stored therein.

One particular embodiment of this invention is shown for illustrative purposes as a modification of the system of Gebhardt et al., already referred to. The Gebhardt et al. application is incorporated herein by reference to facilitate the description and to provide a more complete understanding of the invention. (It is understood that this is merely one application of the invention and that similar applications will become apparent to those skilled in the art.)

Referring to the Gebhardt et al. disclosure, one manner of providing reliability is by duplicate or redundant circuitry. That is, to prevent a single malfunction within any major circuit from causing a total inability to process telephone calls and other data messages through the system, important circuit blocks are duplicated to allow a troublesome circuit to be disabled and in effect replaced by an identical operative circuit. Continuous and practically trouble-free service is thereby assured. For example, the data which causes the control equipment to act in the Gebhardt et al. system is gathered by scanning a plurality of "scan points," each of which reflects the supervisory state of a telephone line. Two scanners are provided in accordance with the duplicate philosophy mentioned above, and each scanner has its own memory unit for storing the information relating to line conditions. Each scanner transmits its stored data to its separate corresponding data transmitter; but only one of the two data transmitters is connected over the data link to the central office control unit, thereby establishing one scanner as "on line" and the other as "off line."

For enhanced reliability each scanner may be controlled as to its time cycle by independent clock circuits. Although data is being transmitted to the central control unit from only one of the scanners at a time (the "on-line" scanner), the standby or "off-line" scanner is prepared to be ordered into service by priming it with the same data stored in the active scanner. Due to the fact that the time slots relative to one of the scanners may not be perfectly aligned with the memory slots of the other scanner, any accidental interconnection between the circuits of the two scanners could cause erroneous data to be stored in the memory of either or both scanners.

More specifically, referring to FIG. 4 of Gebhardt et al., supra, one possible mode of operation of the system (more fully described in the Gebhardt et al. specification) involves the separate circuit clocks 410 and 411 which provide independent control (by connections not shown) of corresponding scanners 416 and 417. While this arrangement is quite satisfactory and fully operative, it can be subject to occasional errors based on erroneous cross-connections between scanners. Thus, data regarding the line conditions of lines scanned by scanner 416 may be arranged to be returned to that scanner over line bus 301 (Gebhardt et al. FIG. 3), and this data must return to the scanner which initiated the interrogation so that storage in the appropriately assigned memory slot can occur.

It is possible, however, for either a mechanical or electrical interconnection to occur between two portions of the normally separate line busses; e.g., from a bent terminal, touching of uninsulated leads, or inductive or capactive coupling of stray scan point switch pulses. Should this occur, data based on the interrogation of a scan point relative to the time cycle of one scanner (e.g., scanner 416) could conceivably return (e.g., over line bus 302) to be stored in the other scanner, which is being run simultaneously in order to keep its memory current preparatory to any possible transfer between scanners. This condition is troublesome because, as indicated above, separate timing cycles may be used in the Gebhardt et al. system and, consequently, a memory slot for one scanner may not precisely correspond in time to a memory slot for the other scanner. The result under these circumstances is that the on-line scanner is deprived of data relating to an interrogated scan point, while the off-line scanner may have received erroneous data intended for a different memory slot from the one in which the data is stored. This result, in practice can occur relatively frequently. Such erroneously stored data may eventually be translated into data which is transmitted to the central control. The original errors are thereby perpetuated.

The present invention in effect eliminates this difficulty by including additional supervisory circuitry within transfer and alarm circuits block 407 of the Gebhardt et al. application to inhibit the off-line scanner during normal data handling. Since the two scanners according to this modification are not simultaneously in operation, any erroneous "crosses" or interconnections such as alluded to above cannot possibly result in the storage of invalid data. In addition, in order to provide for the up-dating of the inhibited off-line scanner's memory so that this memory will be accurate when the off-line scanner is transferred to the on-line condition, the off-line scanner is enabled for a very brief period immediately following a signal to transfer from the on-line scanner to the off-line scanner. During this brief updating interval, the normally inhibited off-line scanner scans the entire complement of scan points and stores all the data required to make its memory current. It is to be noted that this updating interval can be made so short as to be fully accomplished prior to the specified off-line to one-line transfer from one data transmitter to the other. The message generator as well may advantageously be inhibited during this same transfer interval. No significant additional delays are thereby introduced into the circuit.

It is therefore a feature of this invention that means are included in a time-division switching system for preventing data intended for storage in one scanner from reaching another identical standby scanner.

It is a further feature of this invention that circuitry is provided to inhibit one of two duplicate scanners for all but a brief interval prior to a transfer between the scanners.

Another feature of this invention is that timing means control the triggering and inhibiting of the scanning and data transmitting circuits of a time-division switching system.

Figure 2:
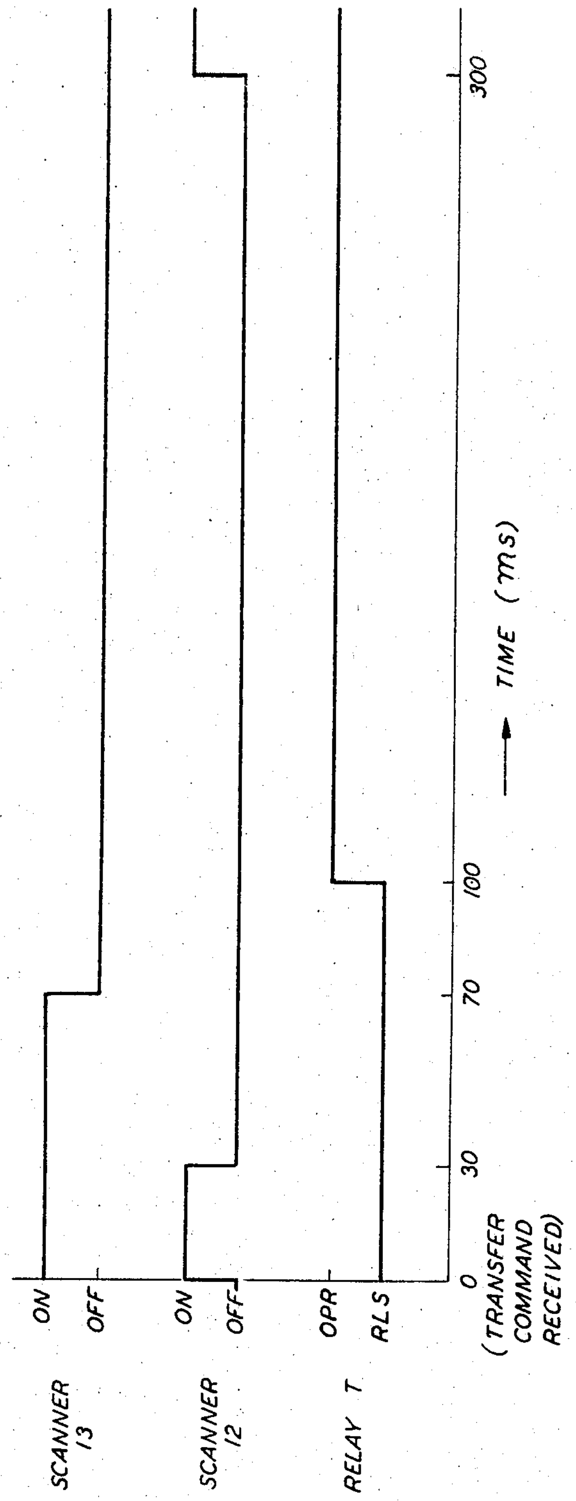

Other objects and featres of this invention will become apparent in conjunction with the following description, the appended claims, and the drawing in which FIG. 1 is a block diagram illustrative of one embodiment of the invention, and FIG. 2 is a time diagram illustrating operational states of various portions of the circuit of FIG. 1.

As has been mentioned above, the circuitry shown enclosed by the dashed lines to the left in FIG. 1 can illustratively be included within the transfer and alarm circuits block 407 of FIG. 4 of the Gebhardt et al. application. When this is the case, the two scanners 12 and 13, which are controlled by logic circuit 8, can be comparable to scanner and memory blocks 416 and 417 respectively, while data transmitters 10 and 11 can correspond to data send blocks 418 and 419 of the Gebhardt et al. application. The remaining blocks of FIG. 1 correspond to similarly labeled portions of FIGS. 1–4 of the Gebhardt et al. application, and are shown merely for illustrative purposes. The subject invention can best be understood by a description of a typical transfer and switching cycle.

Assume, prior to any transfer signal, that scanner 13 is the on-line scanner by an enabling signal from logic circuit 8 on lead 15 and is scanning the scan points which relate to the supervisory states of telephone lines and trunks of a private branch exchange, as more fully discussed in the Gebhardt et al. application. The data initially generated in scanner 13 is transferred over a data link to the central office control unit by means of data transmitter 10. This transmitter is connected through break contact 1 of the T relay (shown in detached form) to the outgoing data link. At the same time, off-line scanner 12 is inhibited by a prior control signal from logic circuit 8 on lead 14. With relay T released, FIG. 2 shows the situation at zero time when a transfer command is assumed received. Such a transfer signal can be forthcoming from control circuitry in the Gebhardt et al. system based on routine maintenance transfers or upon the very type of malfunction in a major circuit block which duplicate circuit design is arranged to overcome.

Transfer control circuit 5 delivers a transfer command to trigger circuit 6 over lead 17 and to the timers within block 7 in FIG. 1. The trigger circuit 6 immediately activates logic circuit 8 by way of lead 16 and causes off-line scanner 12 to be immediately enabled over lead 14. At the same time, all the timing circuits within block 7 are initiated to commence their timing cycles.

When the first of these cycles terminates, illustratively in 30 milliseconds, the enabling signal between logic circuit 8 and off-line scanner 12 also terminates; in addition, an affirmative inhibiting signal is applied to the message generator of off-line scanner 12 from the 30-millisecond output of timing block 7 over normally closed break contact 3 of released relay T. This permits the scanner memory to update rapidly. During this now-terminated 30-millisecond interval, both scanners 12 and 13 have been operating actively and the memory of scanner 12 has been updated. Only scanner 13 was providing outgoing data through data transmitter 10 due to the released condition of relay T.

Logic circuit 8 next affected by the 70-millisecond output from timing block 7 and transmits over lead 15 to on-line scanner 13 an inhibiting signal which disables that scanner. Both scanners 12 and 13 are now inactive as can be seen from the top two lines of FIG. 2. When the 100-millisecond timing cycle has terminated, logic circuit 8 receives this indication from the appropriate lead of timing circuit 7 and transmits to relay driver 9 a pulse which causes relay T to operate. The operation of relay T transfers, by closure of its make contact 2, the outgoing data link to the control unit from data transmitter 10 to data transmitter 11, the latter data transmitter being associated with scanner 12. However, since neither scanner 12 nor scanner 13 is actively interrogating scan points at this time, no additional data is being transmitted over the data link. At the same time, make contact 4 of relay T closes to provide a control circuit path to scanner 13 in readiness for a subsequent transfer command. Control leads 14 and 15 are further interchanged in function at such time.

The circuit remains static between the 100- and 300-millisecond points as can be seen from FIG. 2. This "delay," which is illustratively indicated as 200-milliseconds, permits the newly switched data link to stabilize itself and thereby avoids potentially erroneous responses to transients and other spurious signals. When the 300-millisecond time cycle has elapsed, logic circuit 8 is so informed and an enabling signal is transmitted over the lead 14 to scanner 12 which now becomes the on-line scanner since its data transmitter 11 is now connected over closed make contact 2 of relay T to the outgoing data link.

Referring also to FIG. 2, it can be seen that, following the 300-millisecond point, the scanner which was previously off line (assumed to be scanner 12 in FIG. 1) has now been switched on line and is thereby operative to transfer stored scan point data to its corresponding data transmitter 11. The on-line effect of scanner 12 is illustrated in FIG. 1 by the previously discussed operation of relay T, which connects data transmitter 11 associated with scanner 12 to the outgoing data link and thence to the central office control unit through now closed make contact 2 of relay T. Additionally, scanner 13, which was previously the on-line scanner, had been inhibited at the 70-millisecond point and remains inhibited so that it is now the off-line scanner. Scanner 13 will not be reactivated until a transfer command is received from transfer control circuit 5 as described above with respect to scanner 12.

It is to be noted that once the formerly off-line scanner is enabled at the 300-millisecond point, it is the only scanner which is actively interrogating scan points. From the 300-millisecond point until a subsequent transfer message is received, this being by far the greatest portion of scanning operation time, this on-line scanner is the only one running. Although it has been indicated that the mode whereby both the on-line and off-line scanners are operating simultaneously, as in the Gebhardt et al. system, is fully operative and quite satisfactory, it is nevertheless true that that mode of operation does render the system susceptible to the peculiar cross-errors described above for the same major time interval during which the present invention prevents such errors by inhibiting one of the two scanners.

The Gebhardt et al. mode of operation may, for example, operate both scanners simultaneously for an illustrative period of approximately 15 minutes before a routine or maintenance transfer from the on-line to the off-line scanner is directed; then, following such an order, the off-line scanner is inhibited for 300-milliseconds, so that on a percentage basis, simultaneous scanner operation rendering the system vulnerable to cross-errors exist for 99.97 percent of the time. On the other hand, since the improved system according to this invention finds the off-line scanner generally inhibited except for the brief 30-millisecond updating interval, vulnerability to cross-errors only exists for a miniscule 0.003 percent of the time. The probability of accurate data recordation and transmission is thereby considerably enhanced.

It is to be understood that the above-described arrangements are illustrative of the applications of the principles of the invention. Numerous other arrangements may be derived by those skilled in the art without departing from the spirit and scope of the invention.

What is claimed is:

1. In a time division switching system, a central processing unit, a plurality of data points representative of particular switching conditions, means for scanning said data points, means for transmitting data from said scanning means to said processing unit, means for controlling said data transmitting means to transmit data selectively from one of a first and second portions of said scanning means, and means responsive to said controlling means for selectively inhibiting one of said portions of said scanning means.

2. A system in accordance with claim 1 wherein said controlling means includes a trigger circuit, a plurality of timers, and logical means responsive to said trigger circuit and to selected ones of said timers for directly governing said scanning means.

3. A system in accordance with claim 1 wherein said means responsive to said controlling means includes one of said timers and supplementary switching means.

4. A switching system comprising first and second data controlling positions, a plurality of sources of data to be recorded, first and second supervisory means for selectively observing and storing said data whereby said first supervisory means is normally enabled and said second supervisory means is normally inhibited, transfer means for controlling said supervisory means, means responsive to a command signal from said transfer means for enabling said second supervisory means for a relatively short interval and for then inhibiting said second supervisory means for a relatively long interval, means for inhibiting said first supervisory means after said second supervisory means has been inhibited, and means for enabling said second supervisory means following said relatively long interval.

5. A switching system in accordance with claim 4 and a data link between said first and said second controlling positions, first and second data transmitting means responsive to said first and second supervisory means respectively for transmitting said data over said data link from said first to said second controlling positions, and switch means responsive to said transfer means for disconnecting said first data transmitting means from said data link, and for connecting said second data transmitting means to said data link.

6. A telephone switching system comprising a central office, a plurality of private branch exchanges, a control unit common to said plurality of private branch exchanges, a switching network at each of said private branch exchanges, a plurality of extensions terminating on each of said networks, a plurality of trunks terminating on each of said networks, first normally enabled scanning means at each of said private branch exchanges for maintaining records of the supervisory states of said extensions and said trunks, second normally inhibited scanning means at each of said private branch exchanges, data communication means interconnecting said private branch exchanges and said control unit for normally transmitting information between said first scanning means and said control units, transfer means at each of said private branch exchanges for briefly enabling said second scanning means to collect current data on said supervisory states, and means responsive to said transfer means for subsequently inhibiting said first scanning means, for connecting said second scaning means to said data communication means, and for enabling said second scanning means.

7. A telephone switching system comprising a main office and a plurality of satellite offices responsive to control signals from said main office, said satellite offices each comprising a plurality of extensions, a plurality of trunks, a plurality of time-divided memory slots for receiving data regarding the supervisory states of corresponding ones of said extensions and trunks, scanning means for determining and storing said data in said time division slots, means for selectively transmitting said data from said satellite offices to said main office, and means for controlling the storage of said data in said time division slots including means for selectively inhibiting a portion of said scanning means while the remainder of said scanning means is actively connected to said transmitting means.

8. A telephone switchng system in accordance with claim 7 including in addition a transfer control circuit, and wherein said selective inhibiting means includes triggering means and timing means each responsive to a transfer command from said transfer circuit, logical means controlled jointly by said triggering means and said timing means for governing said scanning means, means responsive to said timing means for directing an inhibiting signal selectively to said portion and said remainder of said scanning means, and switching means responsive to said logical means for selectively connecting said portion and said remainder of said scanning means to said transmitting means.

9. A telephone system comprising a central office and at least one suboffice, said suboffice including a plurality of stations, first and second scanning means for interrogating said stations and for storing data indicative of the states of said stations, data transmitting means selectively connectable to said first and said second scanning means for sending said stored data to said central office, means for transferring said transmitting means between said first and said second scanning means, means for inhibiting the one of said first and said second scanning means not connected to said transmitting means while the other of said first and said second scanning means is interrogating said stations, and means for briefly enabling the inhibited one of said first and said second scaning means in response to said transferring means.

No references cited.

KATHLEEN H. CLAFFY, *Primary Examiner.*

LAWRENCE A. WRIGHT, *Assistant Examiner.*